US012701378B2

(12) United States Patent
Nawfal et al.

(10) Patent No.: US 12,701,378 B2
(45) Date of Patent: Aug. 4, 2026

(54) AMBISONICS CAPTURE OF SOUND FIELD FOR LOUDSPEAKER CALIBRATION AND ROOM PERSONALIZATION

(71) Applicant: Apple Inc., Cupertino, CA (US)

(72) Inventors: Ismael H. Nawfal, Redondo Beach, CA (US); Ariel A. Massias, San Francisco, CA (US); Symeon Delikaris Manias, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 18/641,125

(22) Filed: Apr. 19, 2024

(65) Prior Publication Data

US 2025/0330761 A1 Oct. 23, 2025

(51) Int. Cl.
*H04S 7/00* (2006.01)
*H04R 5/02* (2006.01)
*H04S 3/00* (2006.01)

(52) U.S. Cl.
CPC ............... *H04S 7/301* (2013.01); *H04R 5/02* (2013.01); *H04S 3/008* (2013.01); *H04R 2420/07* (2013.01); *H04S 2400/01* (2013.01); *H04S 2400/15* (2013.01); *H04S 2420/11* (2013.01)

(58) Field of Classification Search
CPC ....... H04S 7/301; H04S 7/305; H04S 2420/11
See application file for complete search history.

(56) References Cited

U.S. PATENT DOCUMENTS 9,093,063 B2 7/2015 Vilkamo et al.
2023/0353938 A1* 11/2023 Bharitkar ................ H04S 7/301

FOREIGN PATENT DOCUMENTS

EP 2210427 B1 7/2010

* cited by examiner

*Primary Examiner* — Ping Lee
(74) *Attorney, Agent, or Firm* — Aikin & Gallant, LLP

(57) ABSTRACT

Audio stimuli are generated and wirelessly sent to inputs of several speaker drivers simultaneously in a room, thereby producing a sound field around a portable audio capture device in the room. A first order ambisonics, FOA capture, of the sound field is generated using multiple microphone outputs of an integrated microphone array in the portable audio capture device. The FOA capture is processed to determine a set of filters for each of the speaker drivers. Each set may have a gain correction filter, a delay filter, and a timbral correction filter. The filters correct for sound coloration, such as that caused by one or more of i) a performance of the speaker driver, ii) acoustic characteristics of the room, and iii) a position of the speaker driver in the room that does not comply with a predetermined stereo or surround sound speaker layout. Other aspects are also described and claimed.

20 Claims, 3 Drawing Sheets

AMBISONICS CAPTURE OF SOUND FIELD FOR LOUDSPEAKER CALIBRATION AND ROOM PERSONALIZATION

An aspect of the disclosure here relates to loudspeaker calibration and room personalization for spatial audio playback of multi-channel sound programs through stereo and surround sound systems. Other aspects are also described.

BACKGROUND

It is desirable to calibrate a surround sound system, such as one having a 7.1.4 surround sound speaker layout, a 5.1 layout, or other surround sound layout, to the playback room so as to preserve artistic intent when the system is rendering a given multi-channel sound program. In a typical technique, a single microphone is held at a prescribed position in the room, such as a listening position at the center of the surround sound speaker layout, while the various speaker drivers of the system are driven one at a time with stimuli, by an audio video receiver. Based on an assumption that the drivers are at predetermined positions (for the given speaker layout), the microphone output is then analyzed by digital signal processing software in the receiver, to correct for the imperfect frequency responses of the drivers and the coloration caused by the room (manifested in the microphone output.) While doing so, the software expects that the microphone output itself has been corrected for frequency response imperfections and performs non-trivial time alignment between the audio in the microphone output and the audio in the stimuli, when determining the corrections. These corrections are delays and gains that are to be applied to the audio signals which are input to those drivers. The above process may need to be repeated with the microphone held at various positions, to compute multiple sets of corrections. These are then averaged before being provided to a renderer, which applies corrections during spatial audio playback of the sound program.

SUMMARY

One aspect of the disclosure here is a method performed by one or more digital processors, for loudspeaker calibration and room personalization. Audio stimuli are generated that are wirelessly sent to inputs of several speaker drivers in a room simultaneously. The speaker drivers are in one or more loudspeaker housings in the room. In response, the speaker drivers produce a sound field around a portable audio capture device in the room that may be held by a user. A first order ambisonics capture, FOA capture of the sound field is made using multiple microphone outputs of an integrated microphone array in the portable audio capture device. The FOA capture is then processed to determine several sets of correction filters, for the several speaker drivers, respectively. Each set of filters may include a gain correction filter, a delay filter, and a timbral correction filter. These filters as a whole correct for sound coloration caused by i) a performance of a respective one of the speaker drivers, ii) acoustic characteristics of the room, and iii) a position of the speaker driver in the room that does not comply with a predetermined surround sound speaker layout.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings. It should be noted that references to “an” or “one” aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
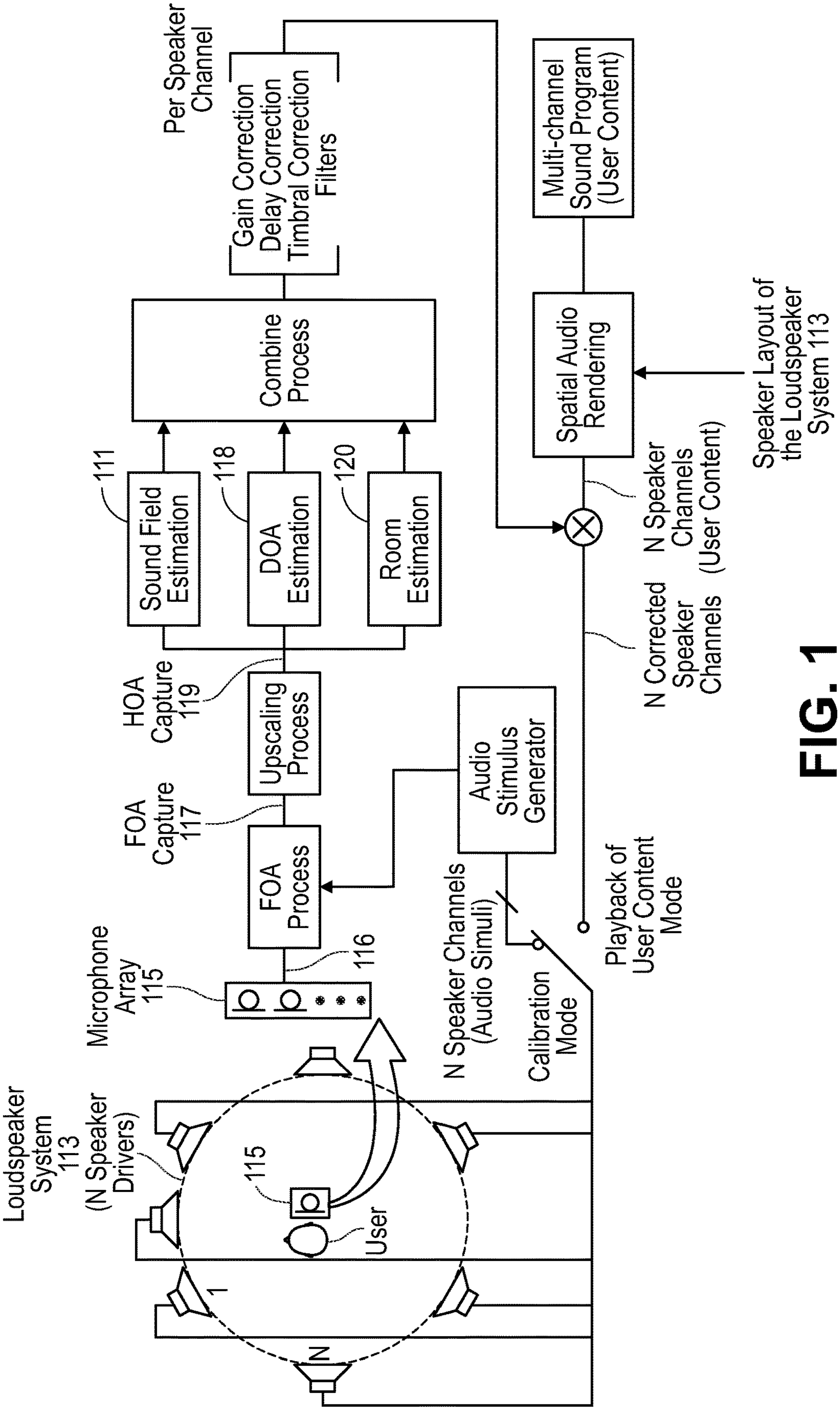
FIG. 1 is a block diagram of an example audio system having a capture device and a loudspeaker system.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Disclosed are methods for real-time ambisonics capture (or measurement) of a sound field in a room, for correcting the spatial audio playback of a multi-channel sound program (user content) by a loudspeaker system in the room.

In one aspect, processing circuitry, such as a programmed processor, automatically determines corrections for the imperfect frequency responses of the loudspeaker system’s drivers, and corrections for the coloration caused by the room’s acoustics. In other words, these are corrections that, when applied to the speaker driver audio signals of the loudspeaker system during spatial audio playback, help achieve loudspeaker system calibration and room personalization. The corrections may be frequency dependent gain values, a timbral correction filter, and time delays, which are computed for the present speaker layout of the loudspeaker system, in view of the source speaker layout of the multi-channel sound program. For instance, the multi-channel sound program may have been created for a source speaker layout that is a stereo speaker layout, as two speaker channels of audio intended for driving two loudspeaker housings positioned along the same horizontal axis and aimed at the listening position each at thirty degrees inward of their respective vertical axis. The present layout, however, may not be accurate, in that it does not comply with a predetermined speaker layout, such as an industry-wide surround sound speaker layout. The corrections serve to make the sound at the listening position emulate what an accurate speaker layout would produce. In another instance, the sound program may have been created for a source speaker layout that is a 5.1 surround sound speaker layout, as six speaker channels of audio (left front, center, right front, left surround, right surround, and low frequency effects.) The corrections that are applied to these six speaker channels serve to make the sound at the listening position emulate that which would be produced by an accurate 5.1 layout. Of course, the techniques described here are also applicable to other surround sound layouts, e.g., a 7.1.4 layout. During playback of the user content, these rendered speaker channels are input to the constituent speakers (speaker drivers) of the present loudspeaker system, after the above described corrections have been applied to those speaker channels (by the processing circuitry.)

In another aspect, the corrections are designed to improve the performance of crosstalk cancellation (XTC) and sound output beam forming algorithms that are applied (during the playback of the user content) to render the multi-channel sound program through the present loudspeaker system. Such corrections may be based on automatically determined distances to and directions of the speaker drivers of the present loudspeaker system, relative to the listening position (position of the portable audio capture device.)

Referring to the block diagram of FIG. 1, a loudspeaker system 113 may be composed of one or more separate housings in a room, each housing having one or more speaker drivers therein (for a total of N being two or more, drivers in the loudspeaker system 113.) The housing may contain an audio amplifier that drives its integrated one or more drivers, such as that of a smart speaker or a wireless speaker. In the example of FIG. 1, the loudspeaker system 113 is depicted as having a 7.1.4 layout having N=12 drivers of which seven drivers or loudspeaker housings are shown spaced apart in the room, for example along a circle as shown at the center of which is a listening position indicated by a symbol representing a user. Not shown are the four height drivers and a low frequency effects driver of the 7.1.4 layout. More generally however, the loudspeaker system 113 may have any surround sound layout, or it may have as few as one loudspeaker housing (having multiple drivers therein.) A user may locate each driver at an arbitrary position in the room. The position may be arbitrary in that the location and orientation of the driver need not be accurate as compared to those specified for an industry-wide stereo speaker layout or an industry-wide surround sound speaker layout such as 5.1 or 7.1.4; the method compensates for such inaccuracies, in the corrections that it computes, by emulating the correct locations and orientations of the constituent drivers of the industry-wide stereo or surround sound speaker layout.

In one aspect, at least some operations of the method that produces the corrections may be performed by a processor of a portable audio capture device, in a calibration mode of operation. Note there is also a playback of user content mode of operation, in which the corrections that have been determined in the calibration mode are applied to the rendered speaker channels of the multi-channel sound program (user content) for spatial audio playback. These two modes are depicted in FIG. 1 by the switch symbol and its two states, respectively. The capture device may be carried by a user, depicted in FIG. 1 as positioned in the center of the speaker layout. The capture device may for example be a smartphone, a tablet computer, or an augmented/mixed reality head worn device. Referring to FIG. 1, the capture device has an integrated microphone array 115 of preferably three or more microphones (unless additional sensors such as a camera or a depth sensor is available, such as in an augmented reality head worn device, to assist an array of only two microphones.) Using the multiple microphone outputs 116 of the array 115, a first order ambisonics capture, an FOA capture 117 of the sound field surrounding the capture device in the room is generated, by the processor, while the capture device, while positioned within the boundary of the speaker layout, is wirelessly sending audio stimuli (produced by an audio stimulus generator) to inputs of all of the constituent drivers of the loudspeaker system simultaneously. As a result, a single measurement is performed that captures the entire sound field in a time efficient manner, without having to stimulate and measure the sound output of each driver of the loudspeaker system independently and sequentially.

Sound produced by the loudspeaker system 113 is picked up by the array 115 in its microphone outputs 116, and a processor processes the microphone outputs 116 to produce the FOA capture 117. This may be done using beamforming algorithms or using a machine learning model based approach. Optionally, the processor also performs an upscaling process to increase spatial resolution by processing the FOA capture 117 into a higher order ambisonics format (second order or greater), an HOA capture 119. The FOA capture 117 or the HOA capture 119 is then processed by algorithms that determine the corrections. These algorithms may include sound field estimation 111 and direction of arrival estimation, DOA estimation 118. The DOA of a given detected sound source (a speaker) may be used to determine how the present speaker layout differs from that of an industry-wide surround sound speaker layout or stereo speaker layout. Room estimation 120 is another algorithm that may be used for determining the corrections.

Figure 3:
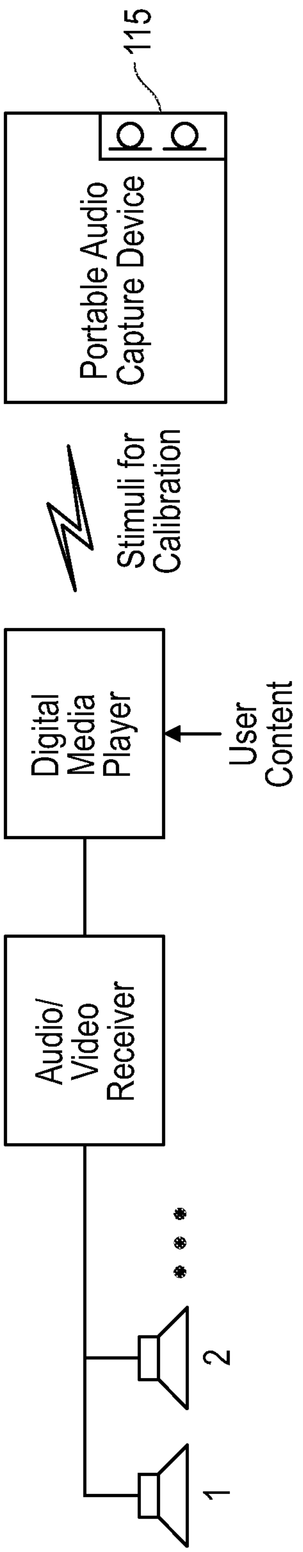
FIG. 3 depicts an example of the audio system in which a digital media player serves as an intermediary during calibration, between the capture device and the loudspeaker system.

In one instance, as illustrated in FIG. 3,) the capture device is wirelessly communicating with a digital media player (also referred to as a streaming device or a streaming box) which will source the user content (multi-channel sound program) from a remote server over the Internet. In the calibration mode (see FIG. 1, where the switch symbol is in the up position), the capture device wirelessly signals the digital media player to "forward" the audio stimuli to the N drivers of the loudspeaker system 113. In such a case, some or all of the N drivers may have a wired connection with an audio/video receiver (which may be considered part of the loudspeaker system 113 of FIG. 1.) The audio/video receiver produces amplified versions of the respective speaker channels coming from the digital media player and delivers them to the drivers over audio cables for example. In that case, the stimuli may be wirelessly transmitted from the capture device to the digital media player, and the digital media player will then forward the stimuli (in the form of speaker channels) to the audio/video receiver where they are amplified before input to the drivers. This is in contrast to another scenario, depicted in FIG. 4, where the capture device wirelessly and directly transmits the audio stimuli to the N drivers (which in that case may be integrated within one or more smart speakers or wireless speakers.)

In one aspect, the measurement made by the capture device (to produce the FOA capture 117) is performed by an FOA process which also applies microphone calibration values to the microphone outputs 116 (e.g., to correct for a non-flat frequency response of each of the constituent microphones of the array 115.) The microphone calibration values may be predetermined (e.g., a microphone frequency response determined at the factory and already stored in memory of the capture device) because the characteristics of the array 3 may be known to the entity that provides the capture device. In some instances, an upscaling process may then be applied to convert the FOA capture into high order ambisonics, HOA, format (an HOA capture 119) that describes the sound field in more spatial detail or with more spatial fidelity.

For the measurement, the processor determines the position of the capture device within the area encompassed by or surrounded by the speaker layout, relative to the positions of the drivers. The position of each driver may be detected via direction of arrival estimation processing of the microphone outputs from the array 115, or via sound field analysis of the subsequent FOA capture or the HOA capture 119. As such, there is no need to assume that the user has correctly positioned the drivers in accordance with an industry-wide surround sound or stereo speaker layout.

Since the FOA capture 117 is the result of a single measurement of the sound produced by all of the drivers of the loudspeaker system simultaneously in response to the audio stimuli, the processor may analyze the FOA capture 117 to determine a number of relative delay alignment values, the number being the total number of all drivers in the loudspeaker system 113. These alignment values may be part of the delay corrections being sought (for playback by the loudspeaker system 113) which ensures that all of the drivers are time aligned, despite differences for example in propagation of the rendered speaker channels and in asymmetric positioning between left and right drivers.

The processor may also perform an analysis of the FOA capture 117 to determine an error in the current orientation or angle of a particular driver, relative to a reference direction. The reference direction may be the direction from a corresponding reference driver as defined by an industry-wide speaker layout, to the current position of the capture device. In some instances, this error may be used by the processor to prompt the user to change the aim of the driver, to make it more directly aimed at the current listening position (the current position of the capture device.)

Figure 2:
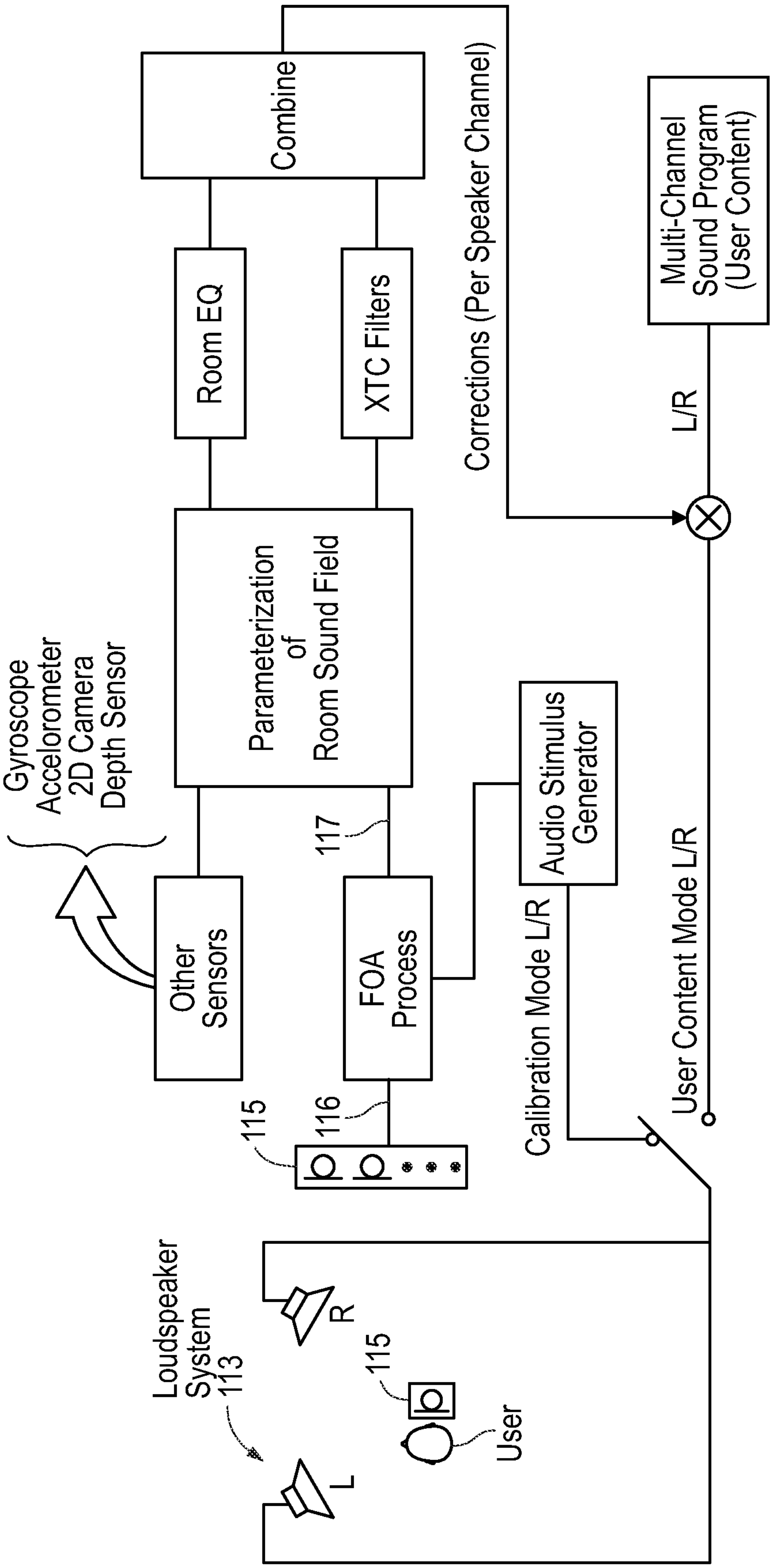
FIG. 2 is a block diagram of another example audio system.

FIG. 2 is a block diagram of another instance of the system that performs the measurement methods introduced above. The system in FIG. 2 shares many of the components and associated processes described above in connection with the system of FIG. 1, including the loudspeaker system 113, the microphone array 115, the FOA capture 117 optionally the HOA capture 119, and the calibration and playback of user content modes of operation. A room sound field is parameterized based on the FOA capture 117 (or optionally based on the HOA capture 119—see above) of the audio stimuli being played back by the loudspeaker system 3. This parameterization may optionally be also based on sensor outputs from for example a 2D camera, a depth sensor, an accelerometer, or a gyroscope (e.g., ones that may be integrated within the capture device being an augmented reality head worn device.) The parameters that are computed may include direct sound parameters and reverberant sound parameters (e.g., room reverberation), and directional reverberation. In the case where the loudspeaker system 113 has only a single housing in which there are multiple speaker drivers, a direct to reverberant ratio may be computed as the room parameter.

The parameters are then used to compute room equalization filters (room EQ), one for each speaker driver. The room EQ serves to reduce the undesirable coloration of the sound, reproduced by the speaker layout, as it is heard in the room and that may be due to certain acoustic characteristics of the room. The room EQ will thus be different for a large room vs. a small room, or a room with wood floors vs. a carpeted room.

Optionally, the parameterization of the sound field may be used to inform the generation of crosstalk cancellation filters (XTC filters), one for each of the rendered speaker channels of the multi-channel sound program. The XTC filters are applied to the rendered speaker channels of the multi-channel sound program for enhancing an immersive feeling. The room EQ and XTC filter for each speaker driver may be combined or fused into a single correction filter that is then applied to the audio signal (speaker channel) rendered during playback, which is then input to its associated speaker driver. In the example shown, the speaker layout is a stereo speaker layout, having a left L driver and a right R driver, and the user content is also in the form of a stereo layout having an L speaker channel and an R speaker channel.

In one aspect, the user carrying the capture device may move around the area encompassed by or inside the perimeter of the speaker layout in the room while the measurements are taken, resulting in two or more measurements each at a different position in the room. The determined playback corrections at the various positions may be combined, e.g., averaged, potentially improving accuracy of a final playback correction. In another aspect, the process compensates for the detected movement of the capture device (e.g., detected via the outputs of the other sensors depicted in FIG. 2, such as one or more of an accelerometer, a gyroscope, a 2D camera, or a depth sensor all of which may be integrated in the capture device), when for example calculating the direction and the distance to each of the speaker drivers (relative to the listening position being the position of the capture device.)

Figure 4:
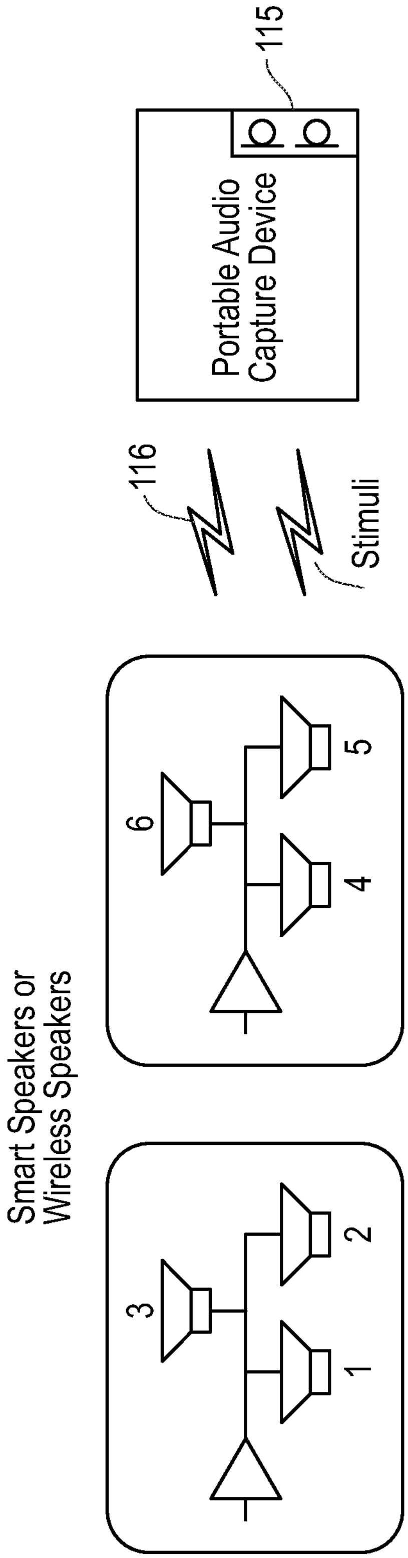
FIG. 4 depicts another example of the audio system, in which there is no digital media player acting as an intermediary, between the capture device and a number of smart speakers or wireless speakers.

In another aspect, one or more parts of the methods described above for producing corrections may be performed by a processor of a smart speaker (in which one or more drivers of the loudspeaker system 113 are integrated) or by a cloud computing service; in those instances, the multiple microphone outputs 116 are wirelessly transmitted from the capture device to the smart speaker or over the Internet to a server of the cloud computing service, where they are time-aligned with the stimuli that were fed to the drivers (and that resulted in the stimuli appearing in the microphone outputs.) This aspect is illustrated in FIG. 4, showing the audio stimuli and the microphone outputs 116 being wirelessly delivered to a smart speaker from the capture device, while in the calibration mode of operation. When such a system is in the playback of user content mode of operation, the user content (multi-channel sound program) could be delivered directly to a processor in the smart speaker from a remote service over the Internet (rather than from the capture device.) In that case, the corrections are not only produced by the processor in the smart speaker, but they are also applied to the speaker channels of the multi-channel sound program by a processor in the smart speaker.

In yet another aspect, triggering the calibration mode of operation (in which the audio stimuli are generated and wirelessly sent to the speaker drivers, the FOA capture of those stimuli is generated, and the FOA capture is processed to determine the corrections) is in response to the processor in the capture device determining that a movie soundtrack is about to be played back through the loudspeaker system 113. The system then changes to the playback of user content mode of operation once the corrections have been determined.

Various aspects described above may be embodied, at least in part, in software. Such techniques may be carried out in an audio system in response to for example its processor executing a sequence of instructions as the software contained in a storage medium, such as a non-transitory machine-readable storage medium (e.g., dynamic random access memory, flash memory). Hardwired circuitry may be used in combination with software instructions to implement the techniques described herein.

In the description, certain terminology is used to describe features of various aspects. For example, in certain situations, the terms "module", "processor", "unit", "renderer", "system", "device", "filter", "engine", "block," "detector," "simulation," "model," and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, while FIG. 1 depicts the loudspeaker system 113 having multiple speaker drivers each of which may be in a different housing, the methods described above could be applied to a loudspeaker system that has a single housing in which multiple speaker drivers are integrated; in that instance, there would be a gain correction filter and a timbral correction filter that correct for sound coloration caused by i) a performance of a respective one of the speaker drivers, and ii) acoustic characteristics of the room, but perhaps no need for any delay filter. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. Personally identifiable information data should be managed and handled to minimize risks of unintentional or unauthorized access or use, and the nature of authorized use should be clearly indicated to users.

What is claimed is:

1. A method performed by one or more digital processors for loudspeaker calibration and room personalization, the method comprising:

a) generating audio stimuli that are wirelessly sent to inputs of a plurality of speaker drivers simultaneously, wherein the speaker drivers are in one or more loudspeaker housings in a room, and in response the speaker drivers produce a sound field around a portable audio capture device in the room;

b) generating a first order ambisonics, FOA, capture of the sound field using multiple microphone outputs of an integrated microphone array in the portable audio capture device; and c) processing the FOA capture to determine a plurality of sets of filters for the plurality of speaker drivers, respectively, each set of filters corrects for sound coloration.

2. The method of claim 1 further comprising:
rendering a multi-channel sound program into a plurality of audio signals;
applying the plurality of sets of filters to the plurality of audio signals, respectively, to produce a plurality of corrected audio signals; and
wirelessly sending the plurality of corrected audio signals to inputs of the plurality of speaker drivers, respectively.

3. The method of claim 2 further comprising
upscaling the FOA capture into a higher order ambisonics, HOA, capture; and
processing the HOA capture to determine the plurality of sets of filters.

4. The method of claim 3 wherein processing the FOA capture or processing the HOA capture comprises:
calculating a direction and a distance to each of the plurality of speaker drivers; and
calculating reverberation of the room.

5. The method of claim 4 further comprising
compensating for movement of the portable audio capture device when calculating the direction and the distance to each of the plurality of speaker drivers, based on sensor outputs of one or more sensors in the portable audio capture device, wherein the one or more sensors include an accelerometer or a gyroscope.

6. The method of claim 5 wherein the one or more sensors include an accelerometer or a gyroscope and a camera.

7. The method of claim 1 further comprising
compensating for movement of the portable audio capture device when calculating one or more of a gain correction filter, a delay filter, and a timbral correction filter, based on sensor outputs of one or more sensors in the portable audio capture device, wherein the one or more sensors include an accelerometer, a gyroscope, or a camera.

8. The method of claim 1 further comprising
compensating for movement of the portable audio capture device when generating the FOA capture, based on sensor outputs of one or more sensors in the portable audio capture device, wherein the one or more sensors include an accelerometer, a gyroscope, or a camera.

9. The method of claim 1 further comprising
triggering the performance of a)-c) in response to a processor in the portable audio capture device determining that a movie soundtrack is about to be played back through the plurality of speaker drivers.

10. A portable audio capture device comprising:
a plurality microphones; and
a processor configured to perform loudspeaker calibration and room personalization in accordance with the method of claim 1.

11. The portable audio capture device of claim 10 wherein the processor is configured to wirelessly send the plurality of sets of filters to a digital media player,
wherein the digital media player renders a multi-channel sound program into a plurality of audio signals and applies the plurality of sets of filters to the plurality of audio signals, respectively, to produce a plurality of corrected audio signals, and sends the plurality of corrected audio signals to inputs of the plurality of speaker drivers, respectively.

12. An article of manufacture comprising a non-transitory machine-readable medium having stored therein instructions that configure an audio system to perform loudspeaker calibration and room personalization, the audio system being configured to:
a) generate audio stimuli that are to be wirelessly sent to inputs of a plurality of speaker drivers simultaneously, wherein the speaker drivers are in one or more loudspeaker housings in a room, and in response the speaker drivers produce a sound field around a portable audio capture device in the room;
b) generate a first order ambisonics capture, FOA capture, of the sound field using multiple microphone outputs of an integrated microphone array in the portable audio capture device; and
c) process the FOA capture to determine a plurality of sets of filters for the plurality of speaker drivers, respectively, each set of filters corrects for sound coloration.

13. The article of manufacture of claim 12 further comprising stored instructions that configure the audio system to:
render a multi-channel sound program into a plurality of audio signals;
apply the plurality of sets of filters to the plurality of audio signals, respectively, to produce a plurality of corrected audio signals; and
send the plurality of corrected audio signals to inputs of the plurality of speaker drivers, respectively.

14. The article of manufacture of claim 13 further comprising stored instructions that configure the audio system to:
upscale the FOA capture into a higher order ambisonics capture, HOA capture; and
process the HOA capture to determine the plurality of sets of filters.

15. The article of manufacture of claim 14 wherein to process the FOA capture or process the HOA capture the audio system is configured to:
calculate a direction and a distance to each of the plurality of speaker drivers; and
calculate reverberation of the room.

16. The article of manufacture of claim 15 further comprising stored instructions that configure the audio system to compensate for movement of the portable audio capture device when calculating the direction and the distance to each of the plurality of speaker drivers, based on sensor outputs of one or more sensors in the portable audio capture device, wherein the one or more sensors include an accelerometer or a gyroscope.

17. The article of manufacture of claim 16 wherein the one or more sensors include an accelerometer or a gyroscope and a camera.

18. The article of manufacture of claim 12 further comprising stored instructions that configure the audio system to compensate for movement of the portable audio capture device when calculating one or more of a gain correction filter, a delay filter, and a timbral correction filter, based on sensor outputs of one or more sensors in the portable audio capture device, wherein the one or more sensors include an accelerometer, a gyroscope, or a camera.

19. The article of manufacture of claim 12 further comprising stored instructions that configure the audio system to compensate for movement of the portable audio capture device when generating the FOA capture, based on sensor outputs of one or more sensors in the portable audio capture device, wherein the one or more sensors include an accelerometer, a gyroscope, or a camera.

20. The article of manufacture of claim 12 further comprising stored instructions that configure the audio system to trigger the performance of a)-c) in response to a processor in the portable audio capture device determining that a movie soundtrack is about to be played back through the plurality of speaker drivers.

* * * * *